US007312831B2

(12) United States Patent
Kennedy

(10) Patent No.: US 7,312,831 B2
(45) Date of Patent: Dec. 25, 2007

(54) RE-INSERTING VBI DATA USING OSD APPARATUS AND METHOD

(75) Inventor: Joseph L. Kennedy, Buford, GA (US)

(73) Assignee: Wegener Communications, Inc., Duluth, GA (US)

(*) Notice: Subject to any disclaimer, the term of this patent is extended or adjusted under 35 U.S.C. 154(b) by 320 days.

(21) Appl. No.: 10/663,255

(22) Filed: Sep. 16, 2003

(65) Prior Publication Data
US 2005/0058432 A1    Mar. 17, 2005

(51) Int. Cl.
H04N 7/08    (2006.01)
H04N 7/087    (2006.01)

(52) U.S. Cl. .................. 348/478; 348/569; 348/473; 348/461; 348/589; 345/531

(58) Field of Classification Search ........... 348/461, 348/473, 477, 478, 479, 476, 569, 567, 739, 348/589, 598, 600, 605, 723, 725, 729; 345/530, 345/531, 538, 548, 641, 629, 638, 716
See application file for complete search history.

(56) References Cited

U.S. PATENT DOCUMENTS

| | | | |
|---|---|---|---|
| 5,579,057 A * | 11/1996 | Banker et al. | 348/589 |
| 5,589,853 A * | 12/1996 | Fujiki | 345/601 |
| 5,594,551 A | 1/1997 | Monta | |
| 5,623,316 A * | 4/1997 | Naito et al. | 348/569 |
| 5,657,414 A | 8/1997 | Lett et al. | |
| 5,701,383 A | 12/1997 | Russo et al. | |
| 5,742,797 A * | 4/1998 | Celi et al. | 345/548 |
| 5,832,174 A | 11/1998 | You | |
| 5,841,940 A | 11/1998 | Haines | |
| 5,844,615 A * | 12/1998 | Nuber et al. | 375/240.01 |
| 5,946,051 A * | 8/1999 | Bril | 348/553 |
| 5,953,073 A | 9/1999 | Kozina et al. | |
| 5,995,161 A * | 11/1999 | Gadre et al. | 348/564 |
| 6,088,703 A | 7/2000 | Kaneko | |
| RE36,801 E | 8/2000 | Logan et al. | |
| 6,169,842 B1 | 1/2001 | Pijjenburg et al. | |
| 6,169,845 B1 | 1/2001 | Yamamoto | |
| 6,233,389 B1 | 5/2001 | Barton et al. | |
| 6,239,794 B1 * | 5/2001 | Yuen et al. | 725/41 |
| 6,304,714 B1 | 10/2001 | Krause et al. | |
| 6,324,338 B1 | 11/2001 | Wood et al. | |
| 6,327,418 B1 | 12/2001 | Barton | |
| 6,327,419 B1 | 12/2001 | Barton | |
| 6,351,289 B1 * | 2/2002 | Chen et al. | 348/478 |
| 6,430,363 B2 | 8/2002 | Sasaki et al. | |
| RE37,881 E | 10/2002 | Haines | |
| 6,467,093 B1 | 10/2002 | Inoue et al. | |
| 6,542,695 B1 | 4/2003 | Akiba et al. | |
| 6,567,127 B1 * | 5/2003 | Orr et al. | 348/478 |
| 6,636,268 B1 * | 10/2003 | Ngai | 348/478 |

(Continued)

Primary Examiner—David Ometz
Assistant Examiner—Jean W. Désir
(74) Attorney, Agent, or Firm—Husch & Eppenberger LLC

(57) ABSTRACT

A method of reinserting Vertical Blanking Interval (VBI) data in a digital video signal includes creating a gray scale palette in a an On Screen Display (OSD) memory; sizing a VBI area in an OSD memory; locating a VBI area in an OSD memory; generating a VBI luma waveform bitmap; and overlaying the VBI luma waveform bitmap in a DVB video bit stream according to the gray scale palette, size and location data stored in the OSD memory.

27 Claims, 4 Drawing Sheets

U.S. PATENT DOCUMENTS

| | | | |
|---|---|---|---|
| 6,664,970 B1 * | 12/2003 | Matsushita | 345/581 |
| 6,678,009 B2 * | 1/2004 | Kahn | 348/569 |
| 6,681,285 B1 * | 1/2004 | Ng | 710/309 |
| 6,895,166 B1 * | 5/2005 | Schriebman | 386/46 |
| 6,903,733 B1 * | 6/2005 | Greenberg et al. | 345/204 |
| 6,961,556 B2 * | 11/2005 | James et al. | 455/403 |
| 2001/0055465 A1 | 12/2001 | Inoue | |
| 2002/0048448 A1 | 4/2002 | Daniels | |
| 2002/0097986 A1 | 7/2002 | Matoba et al. | |
| 2002/0118299 A1 * | 8/2002 | Kahn | 348/569 |
| 2002/0168178 A1 | 11/2002 | Rodriguez et al. | |
| 2002/0196361 A1 | 12/2002 | Cho et al. | |
| 2002/0196365 A1 | 12/2002 | Cho et al. | |
| 2003/0021589 A1 | 1/2003 | Lin | |
| 2003/0026597 A1 | 2/2003 | Cho et al. | |
| 2003/0110511 A1 | 6/2003 | Schutte et al. | |
| 2003/0110513 A1 | 6/2003 | Plourde, Jr. et al. | |
| 2003/0133692 A1 | 7/2003 | Hunter | |

* cited by examiner

RE-INSERTING VBI DATA USING OSD APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention involves the re-insertion of Video Blanking Interval (VBI) data into a video signal using an On-Screen Display (OSD) processor.

2. Related Art

A single video image as seen on a television screen is called a frame. Thirty (30) frames appear per second. A frame consists of two (2) interlaced vertical fields; an odd field and an even field. The image frame is scanned twice at a 60 Hz rate, once for each field. The lines of the second field are offset to fall between the lines of the first field in a process called interlacing. For a National Television Systems Committee (NTSC) standard frame of 525 lines, each vertical field will have 262.5 lines.

After scanning each field, the electron gun used to illuminate the image inside a television monitor's cathode ray tube ("CRT") must move back up to the top of the tube to begin the next field. In order to prevent unwanted illumination of the CRT during this vertical retrace, the signal must remain blank until the gun is in position to begin scanning the next field. Accordingly, at the beginning of each vertical field, a period equal to several horizontal lines (40 lines under NTSB standards) is used for a vertical blanking interval, which corresponds to the amount of time it takes the electron gun to return to the top of the screen.

The vertical blanking interval (VBI) portion of the television signal is commonly used to carry information other than video or audio, such as closed-captioned text or stock market data. Such data is called VBI data. It generally originates at an uplink or original video source.

In digital systems, VBI data is transmitted separately from the general video signal, in order to conserve bandwidth. Accordingly, systems have been developed for the reinsertion of the VBI data into the video signal, as that signal is processed. These systems generally require separate, additional components or modules in the receiving hardware.

VBI data is seldom if ever compressed, since it can be more than adequately transmitted in 2 to 48 bytes of data. Frequently VBI data is simply sent with header information in digital broadcasting bitstreams. It generally has packet identifiers that are different than the basic video bitstream. VBI data such as "line 21," "WINK," "AMOL," are sent according to known standards, such as EN 301-775 or ATSCA 53. They are sent with different packet identifiers than media content data. Proprietary standards may also be used.

Because the VBI data is separately transmitted, separate hardware has had to be developed in order to re-insert it into the general video signal at the receiver. The typical approach was to use the video encoder (DENC). This works for analog systems, but not for digital video output streams. Accordingly, other hardware had to be developed such as with Field Programmable Gate Arrays. Later, decompression chips have been developed that had a separate component for generating VBI waveforms for VBI insertion. As a result, expense and complexity for such hardware has increased. There is a need in the industry for more efficient, faster and more economical method and apparatus for the reinsertion of VBI data.

Separately, it is typical for television equipment to display other information on the display screen during the viewing of a program. This information may include text menus, as for programming guides, graphics such as a logo, or local weather announcements. Since this data generally originates locally, from sources other than the original source of the video, separate processing components have been developed for its display. In particular, On-Screen Display, (OSD), is executed by a component usually included on the decompression chips used for decompressing digital video signals such as digital MPEG. OSD processors typically overwrite video in order to display text on the video screen. Typically, a decompression chip prepares bitmap data for the display of a field of video, and then the OSD processor sums in the OSD data to overwrite the video data.

OSD components vary, however they generally provide for the storage or repeated regeneration of the following: a gray scale (or color) palette, dimensions for the size of the OSD text to be displayed and a location for it to be displayed. Typically an OSD controller is combined with an OSD data area in an Application Specific Integrated Chip (ASIC), all of which are usually supplemental to the decompression functions of the same ASIC.

SUMMARY OF THE INVENTION

The present invention is an on-screen display processor configured to reinsert VBI data into a digital video bitstream and a method for executing the same.

In one aspect of the present invention, an OSD processor reinserting VBI data into a DVB bitstream includes an OSD processor, and OSD data area or memory configured to maintain a gray scale palette, a VBI data size and VBI data location identification. An input buffer for receiving VBI data and an output buffer for sending VBI data onwards into the DVB bitstream are in operative communication with the OSD.

In one aspect of the present invention VBI data is reinserted into a DVB bitstream by creating a gray scale palette in an OSD data area or memory, sizing a VBI data area, locating a VBI area and optionally storing both in an OSD data storage area or other memory associated with it. Alternatively this data may be regenerated upon demand. The information is used by the OSD for generating a VBI luma waveform bitmap. The OSD overlays the VBI luma waveform bitmap onto an uncompressed digital video signal for display output.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 1:
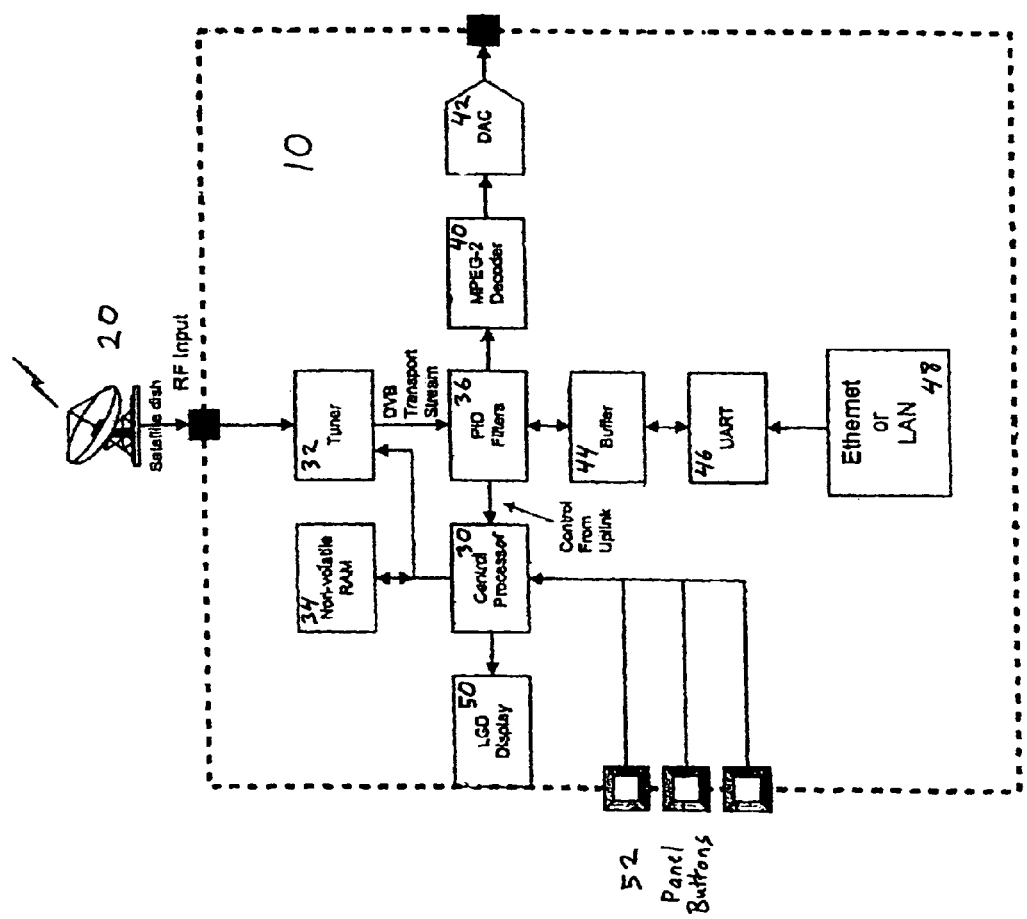
FIG. 1 is a block diagram of the components of an integrated receiver decoder.

Referring now to the figures in which like reference numerals indicate like elements, FIG. 1 is a block diagram of a typical integrated receiver/decoder unit (IRD) 10. The IRD 10 receives a radio frequency input comprising a standardized digital video broadcast bitstream according to the MPEG protocol from satellite dish 20. Components within the IRD 10, all which are in operative communication with one another, include the control processor 30, tuner 32, RAM 34, packet identification filters 36, MPEG decoder 40, digital analog converter 42, buffer 44, Universal Asynchronous Receiver/Transmitter (UART) 46, a link to an Ethernet or LAN 48, and an operator interface comprised of a LCD display 50 and panel buttons 52. The digital analog converter outputs a signal comprising video, audio or other data to display devices such as a television or speakers (not shown). The operation of a typical IRD 10 is more fully described in U.S. patent applications No. 10/350,930 and 10/400,972 incorporated by reference herein.

Figure 2:
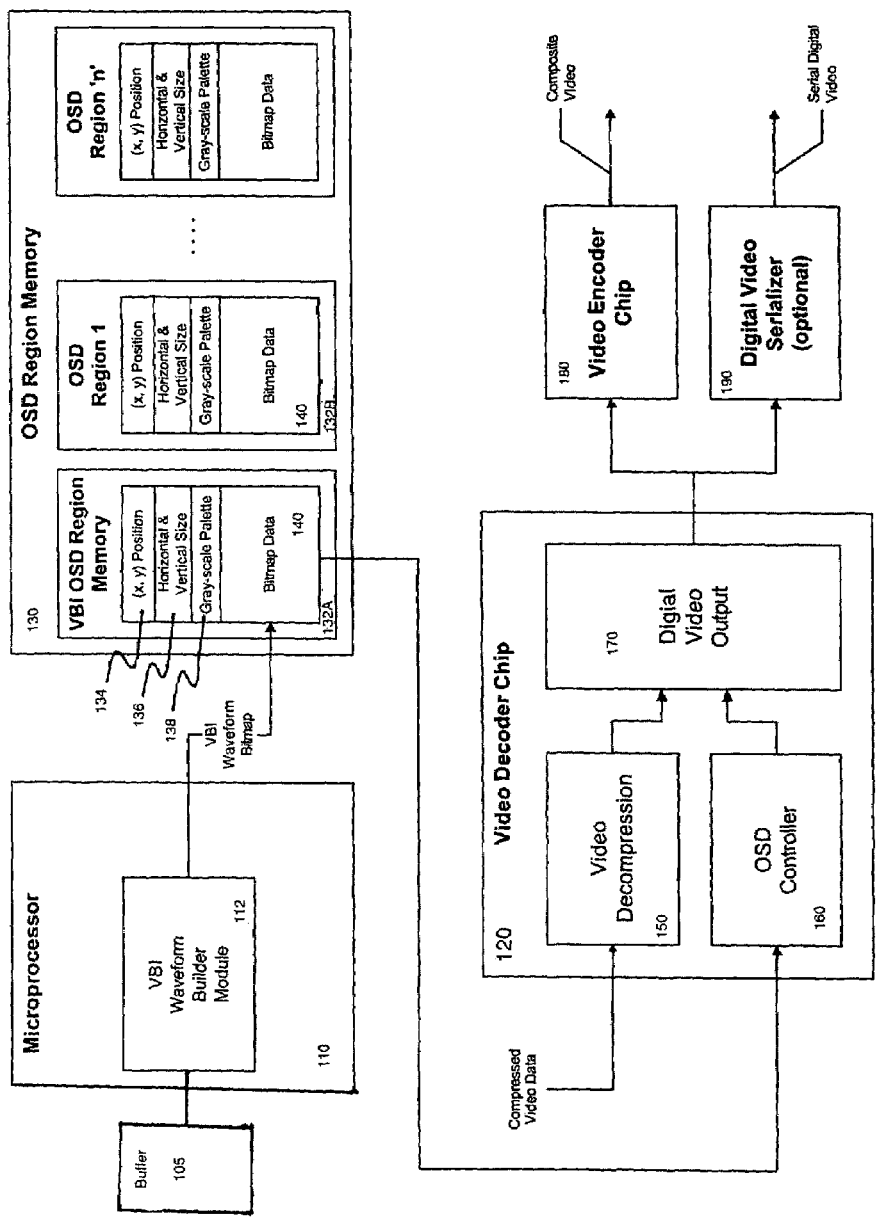
FIG. 2 is a block diagram of a OSD controller configured for VBI reinsertion.

FIG. 2 discloses some of the components within the control processor 30. The control processor 30 may be configured in a variety of ways. A separate microprocessor 110 may work in conjunction with a video decoder chip 120, or a single ASIC may include both functions as separate modules. In either case a memory region is dedicated to OSD.

Within microprocessor 110 is a dedicated VBI waveform builder module 112. In the depicted embodiment, raw VBI data is retained in buffer 105, after it has been decrypted and demultiplexed. The raw data is fed to the wave form builder 112 on demand. Optionally, separate buffers (not shown) may be used for even and odd field data. The waveform builder produces one or more pixel values for each byte of data to be transmitted, as specified by the applicable VBI standard. For example, it may sinusoidally shape the edges of the video transitions. Ancillary waveforms, such as a clock run-in preamble, may be added as well, by the waveform builder.

The OSD memory region 130 is configurable to include multiple OSD memory regions 132 dedicated to various tasks. Within each OSD memory region dedicated to inserting VBI data, a portion will be configured for storing information locating the VBI display according to an XY position 134. A single pixel among the horizontal array of pixels, 720 in NTSC format, is identified as the beginning X position. Similarly one of the lines in the vertical array is identified as the starting Y position. Memory region 132 will also have a horizontal and vertical size 136 configured. Size is defined by a number of pixels (horizontal length) by a number of lines (vertical height). These positions and dimensions are largely hardware specific. An eight bit gray scale palette 138 is also stored in the memory region 132. Finally, a memory component for the actual bitmap data 140 is configured and associated with the palette and position and size data. The bitmap data is received from the VBI waveform builder module 112 and temporarily stored in the bitmap data region 140.

A palette is a lookup table. Different memory regions may each have their own palette, as in the depicted embodiment, or each memory region may alternatively refer to a palette stored in a different memory region. Palettes may be configured for different ranges of color. For example, if two bits are allocated per pixel, four colors are available. If four bits are allocated per pixel, sixteen colors are available. If eight bits are allocated per pixel, 256 colors are available. Different palette sizes may be used within the scope of the present invention according to available memory capacity and speed requirements. In the depicted embodiment, eight bits are used per pixel.

In one embodiment of the invention, there will be two memory regions dedicated to VBI data insertion. These correspond to the two fields of even lines and odd lines that together form a single frame of video image. If necessary, an input buffer and an output buffer may be used.

During the display of an image, a small state machine first picks up the palette from SDRAM and loads it into the lookup table. Then the OSD region start and stop addresses are read. When the display reaches the OSD start position (defined in the bitmap) the bitmap is sent pixel by pixel to the lookup table and the display switches from video to the output of the lookup table, or a mixture of both.

Line numbers are used to define the top and the bottom of the OSD region. The positions of the left and right edges of an OSD region are defined as units of pixel clock cycles from the falling edge of the horizontal synchronization signal.

The video decoder chip 120 is largely dedicated to decompression of the main video stream. The compressed video data is received from the satellite dish through the tuner and decompressed at the video decompression component 150. The video decoder chip 120 will also have the OSD controller 160. The digital video output 170 combines the two signals and forwards them to a video encoder chip 180. The digital video output 170 includes a mixing unit. Mixing is typically, but not necessarily, done by summing the luma and, if applicable, chroma values of each pixel. Optionally, a digital video serializer 190 may also receive the digital video output.

For reinsertion of the VBI data, the OSD controller receives the information from the VBI memory region 132, alternating between receiving the even and the odd field data. The VBI data is then summed into the decompressed digital video bitstream at the digital video output 170. A mixing function may provide for a percentage of weight given to OSD inserted data, ranging from zero, which is transparent and allows the underlying video signal to be seen, to 100% which is completely opaque, and completely obscures the underlying video.

In the present invention, an OSD region 132 is dedicated to receiving the VBI waveform builder bitmap and is configured so that a separate region of screen space is dedicated to display of VBI data. This may be executed by a single VBI data region, or two VBI data regions; one for each field. As separate field VBI/OSD data regions are configured, they may each have a separate palette or may share the same palette.

Figure 3:
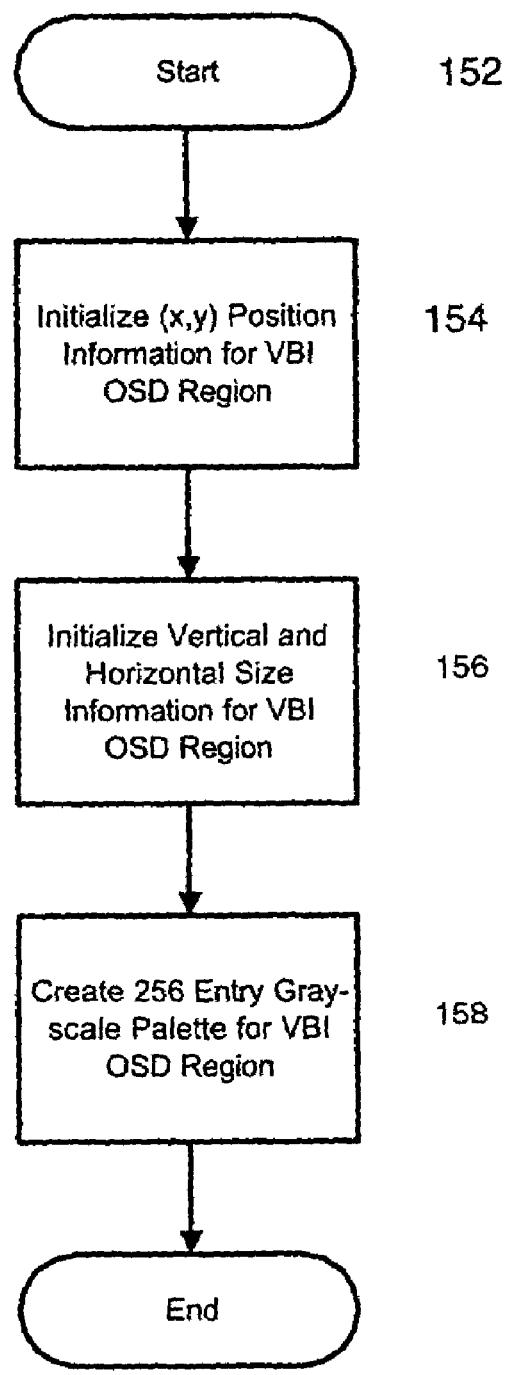
FIG. 3 is a flow chart depicted a method for VBI reinsertion set up in an OSD.

FIG. 3 is a flow chart for setup of the OSD memory dedicated to VBI reinsertion (132). At set up 152 the first step 154 is to initialize the position data in the OSD memory region 134. A second step 156 is to initialize the vertical and horizontal size information in the OSD memory region 136 and a final step 158 is to create the gray scale palette for the VBI/OSD region 138. After executing these steps the OSD memory region is prepared for accepting VBI data and reinserting it into the overall data digital video broadcasting bitstream.

In operation, the depicted embodiment maintains separate OSD memory regions 132A and 132B for insertion of first even field VBI data and second odd field VBI data. Accordingly, they will be read from and written to alternatively. Because each field takes 16.7 milliseconds to display, the VBI waveform builder module 112 is capable of building a next waveform in adequate time for the method of the present invention to be applied through only a single OSD memory region configured for the VBI data insertion. Extra processing for executing the method of the present invention through a single OSD memory region would include changing the bitmap data to skip every other line for an even field and skip the alternate lines for the odd field.

However, the operation of the depicted embodiment is that while an even field is displayed, the VBI waveform builder will write the bitmap to the odd field memory region 132B. After receipt of the next vertical sync, the decoder chip will request the odd field VBI insertion data, and it will be read from odd OSD memory region 132B. At this time, the VBI waveform builder will write to the even field OSD memory region 132A its next bitmap.

Figure 4:
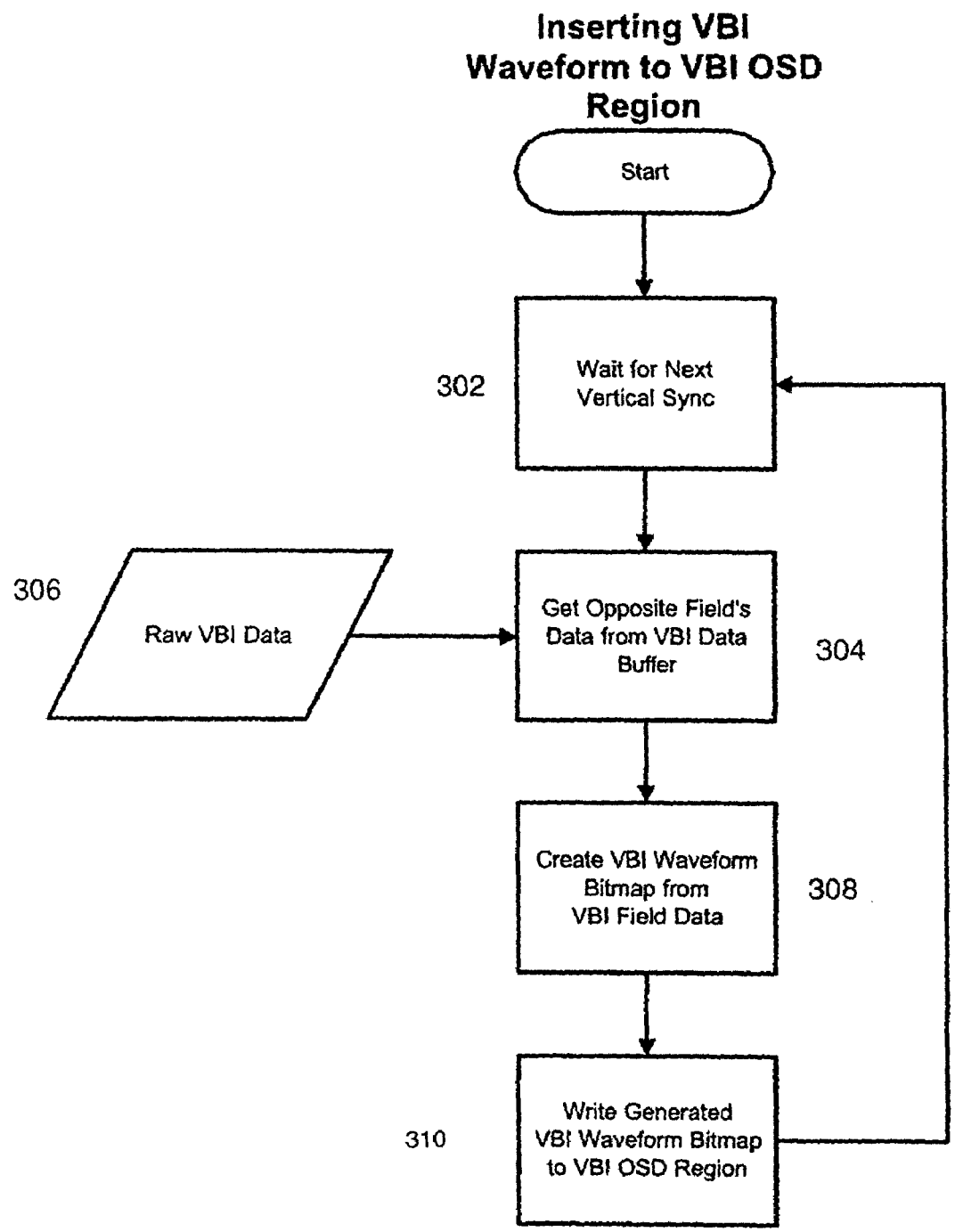
FIG. 4 is a flow chart for reinsertion of VBI using OSD.

FIG. 4 is a flow chart for the actual insertion of the VBI waveform video OSD region. This flowchart depicts a single writing to a single OSD memory region. When a vertical sync is received 302, the VBI waveform builder 112 calls 306 for the next field's raw VBI data 304 held in the raw VBI data buffer 105 (FIG. 2). The VBI waveform bitmap is generated 308. The VBI waveform builder 112 then writes the VBI waveform bitmap it has generated to the opposite field OSD memory region 132 at step 310. The VBI waveform builder module then waits for the next vertical sync to execute these steps again with the original field's next unit of VBI data.

Having read the opposite fields VBI data from buffer 132, the OSD controller overwrites it onto the decompressed video at the digital video output.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An On Screen Display processor for reinserting Vertical Blanking Interval data in a digital video signal comprising:
   an On Screen Display controller;
   a Vertical Blanking Interval waveform builder module configured to create a Video Blanking Interval Data bitmap;
   an On Screen Display memory, said On Screen Display memory being configured to retain Vertical Blanking Interval position data, Vertical Blanking Interval size data and a Vertical Blanking Interval gray scale palette;
   said On Screen Display controller being configured to receive the Vertical Blanking Interval data bitmap from said Vertical Blanking Interval waveform builder module and insert the Vertical Blanking Interval data bitmap into a digital video signal in operative communication with said On Screen Display controller, according to the position, size and gray scale data stored in said On Screen Display region memory; wherein an even field of said Vertical Blanking Interval data bitmap is inserted separately from an odd field of said Vertical Blanking Interval data bitmap.

2. The processor of claim 1 wherein said Video Blanking Interval Data gray scale palette remains stored in said On Screen Display memory between uses.

3. The processor of claim 1 wherein the Vertical Blanking Interval Data position data remains stored in said On Screen Display memory between uses.

4. The processor of claim 1 wherein the Vertical Blanking Interval Data size data remains stored in said On Screen Display memory between uses.

5. The processor of claim 1 wherein said On Screen Display Controller is configured to insert the Vertical Blanking Interval waveform bitmap by summing said waveform bitmap with the digital video signal.

6. The processor of claim 1 wherein the video bitstream into which the On Screen Display processor inserts the Vertical Blanking Data is configured according to MPEG protocols.

7. The processor of claim 1 wherein said video blanking interval grayscale palette is regenerated for each use.

8. The processor of claim 1 wherein said video blanking interval position data is regenerated for each use.

9. The processor of claim 1 wherein said video blanking interval size data is regenerated for each use.

10. The processor of claim 1 further comprising an input buffer in operative communication with said Vertical Blanking Interval waveform builder.

11. The processor of claim 1 further comprising an output buffer in operative communication with said Vertical Blanking Interval waveform builder.

12. The processor of claim 1 further comprising separate input buffers for even and odd fields, each of said input buffers being in operative communication with said Vertical Blanking Interval waveform builder.

13. The processor of claim 1 further comprising an integrated receiver and decoder in which said On Screen Display processor is operatively deployed.

14. The processor of claim 1 wherein said Vertical Blanking Interval waveform builder is embodied in a separate microprocessor adapted for operative communication with a processor processing media content data streams.

15. The processor of claim 1 wherein said On Screen Display controller is configured to add ancillary wave forms.

16. The processor of claim 15 wherein said On Screen Display controller is configured to add clock run in preambles.

17. The processor of claim 1 further comprising at least one additional memory region, each additional memory region being configured to retain said Vertical Blanking Interval position data, said vertical blanking interval size data, and said Vertical Blanking Interval grayscale palette.

18. The processor of claim 17 wherein further comprising at least one first memory region for even fields and at least one second memory region for odd fields.

19. The processor of claim 1 wherein said grayscale palette allocates eight bytes per pixel.

20. The processor of claim 1 further comprising a digital video serializer in operative communication with a digital video output, said digital video output receiving the output of said On Screen Display controller.

21. The processor of claim 1 wherein Vertical Blanking Interval data is displayed according to a screen space size defined at a single Vertical Blanking Interval data region.

22. The processor of claim 1 wherein Vertical Blanking Interval data is displayed according to a first Vertical Blanking Interval data size region for an even field and a second Vertical Blanking Interval data size region for an odd field.

23. The processor of claim 22 wherein each separate Vertical Blanking Interval data region has a separate gray-scale palette.

24. The method of claim 1, wherein the On Screen Display memory comprises a bitmap data region and the Vertical Blanking Interval luma waveform bitmap is temporarily stored in the bitmap data region.

25. The processor of claim 1, wherein the On Screen Display memory is further configured to temporarily store the Vertical Blanking Interval Data bitmap.

26. On Screen Display processor for reinserting Vertical Blanking Interval data in a digital video signal comprising:
 an On Screen Display controller;
 a Vertical Blanking Interval waveform builder module configured to create a Video Blanking Interval Data bitmap;
 an On Screen Display memory, said On Screen Display memory being configured to retain Vertical Blanking Interval, position data, Vertical Blanking Interval size data and a Vertical Blanking Interval gray scale palette;
 said On Screen Display controller being configured to receive the Vertical Blanking Interval waveform bitmap from said Vertical Blanking Interval waveform builder module and insert the Vertical Blanking Interval waveform bitmap into a digital video signal in operative communication with said On Screen Display controller, according to the position, size and gray scale data stored in said On Screen Display region memory wherein said Vertical Blanking Interval bitmap is further configured to skip every other line on an even field and skip alternate lines on an odd field.

27. An On Screen Display processor for reinserting Vertical Blanking Interval data in a digital video signal comprising:
 an On Screen Display controller;
 a Vertical Blanking Interval waveform builder module configured to create a Video Blanking Interval Data bitmap;
 an On Screen Display memory, said On Screen Display memory being configured to retain Vertical Blanking Interval position data, Vertical Blanking Interval size data and a Vertical Blanking Interval gray scale palette;
 said On Screen Display controller being configured to receive the Vertical Blanking Interval waveform bitmap from said Vertical Blanking Interval waveform builder module and insert the Vertical Blanking Interval waveform bitmap into a digital video signal in operative communication with said On Screen Display controller, according to the position, size and gray scale data stored in said On Screen Display region memory wherein said Vertical Blanking Interval waveform builder writes a bitmap to an even field memory region during the same clock cycle as an odd field memory region is read from memory.

* * * * *